April 6, 1943.  P. McSHANE  2,315,637
VARIABLE VOLTAGE CONTROL SYSTEM
Filed Oct. 24, 1940
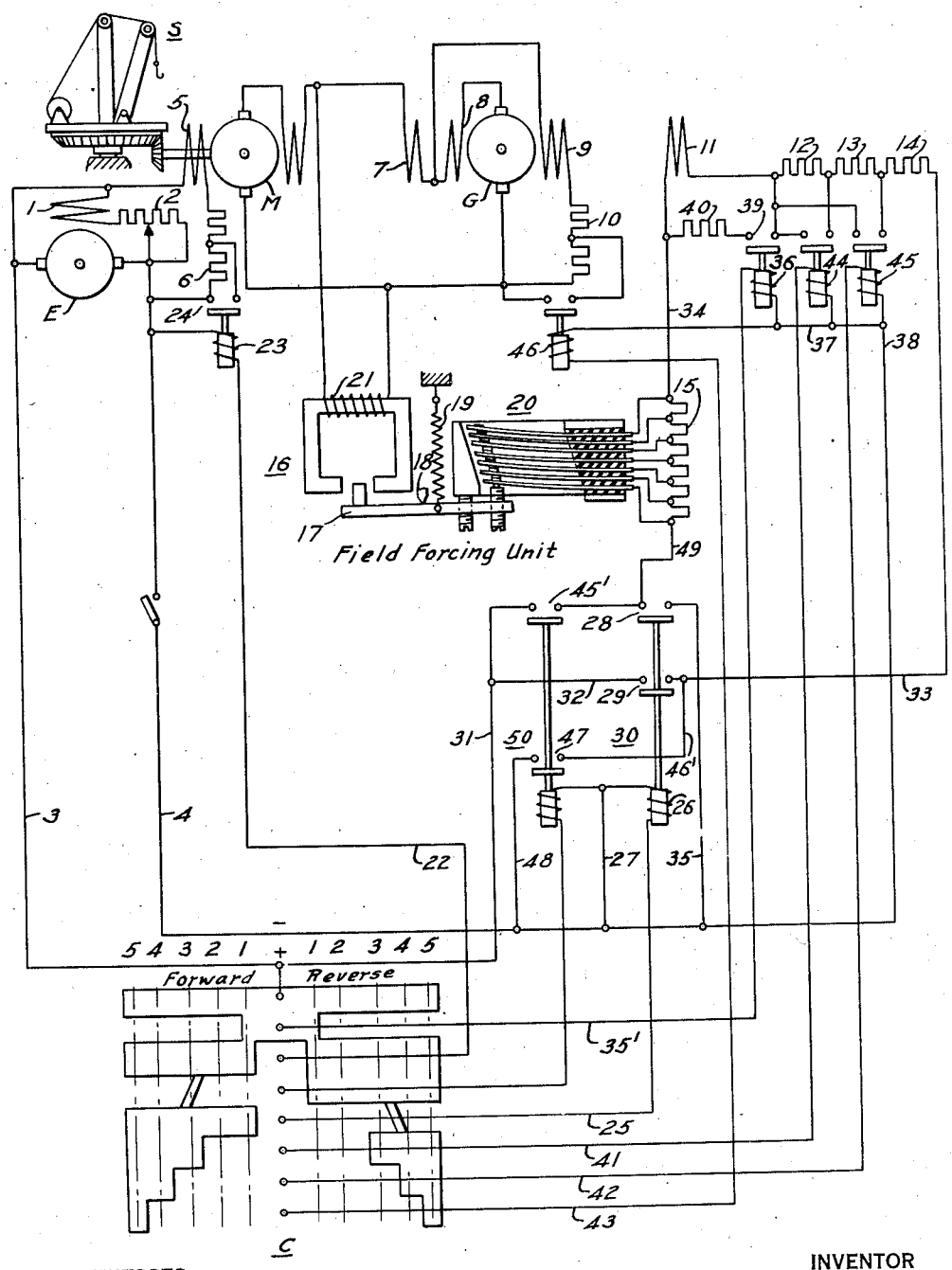
WITNESSES:
H. F. Susser
Wm. J. Ruano
INVENTOR
Phelan McShane.
BY
Paul E. Friedemann
ATTORNEY Patented Apr. 6, 1943

2,315,637

UNITED STATES PATENT OFFICE 2,315,637

VARIABLE VOLTAGE CONTROL SYSTEM

Phelan McShane, Pittsburgh, Pa., assignor to Westinghouse Electric & Manufacturing Company, East Pittsburgh, Pa., a corporation of Pennsylvania Application October 24, 1940, Serial No. 362,542

9 Claims. (Cl. 172—179)

My invention relates to a variable voltage system for controlling the drive of an electric motor.

Generators for variable voltage (Ward-Leonard system) are frequently supplied with separately excited and self-excited shunt fields and a series field so connected that the flux produced by the series field opposes that produced by the shunt field, except during the retardation portion of the cycle.

In many applications where variable voltage systems are used, it is desirable to automatically limit the torque that the motor can exert to a predetermined value. Swing, hoist and crowd motions of electric shovels provide examples of specific applications.

To so limit the motor torque, a differentially connected series field is provided in the generator. With this arrangement the generator voltage decreases with increased current output and thus limits the current supplied to the motor and consequently the torque is limited even when stalled. A disadvantage of the usual arrangement is that, during the accelerating period the current is also high, which tends to limit the generator voltage, resulting in sluggish starting.

An object of my invention is to overcome the above mentioned disadvantage by reducing the length of time required to accelerate by automatically forcing the separately excited generator field during the accelerating period and during a portion of the retardation period.

A more specific object of my invention is to provide means for forcing the generator field, which consists of a separately excited field, a current limiting resistor normally in series with it, a single or a multiplicity of contacts, disposed so as to short circuit the resistor during a portion of the accelerating period and which will, as generator voltage increases, automatically open, so as to reduce the current flowing in the separately excited field.

Another object of my invention is to limit the torque delivered by the motor during the retardation period.

Other objects and advantages will become more apparent from a study of the following specification when considered in conjunction with the accompanying drawing, in which:

The single figure is a schematic showing of a control system embodying the principles of my invention.

Referring more particularly to the single figure, E denotes an exciter having a field winding 1 and a variable resistor 2 and which exciter furnishes direct current energizing potential through conductors 3 and 4, which conductors are also marked (+) and (—), respectively. Exciter E furnishes energizing potential to a separately excited field winding 5 of motor M through a resistor 6 in series therewith. A variable voltage generator G controls the applied potential to the driving motor M which in turn drives a suitable load such as, for example, the swing motion of an electric shovel S. Generator G has a differential series field winding 7, the commutating field winding 8 and a self-excited shunt field winding 9, together with a resistor 10 in series with the field winding 9. In addition, generator G has a separately excited field winding 11 having in series therewith a plurality of resistors 12, 13, and 14, and a resistor unit 15.

It will be apparent that by varying the field strength of the separately excited field winding 11, the speed of motor M may be controlled. Likewise, by controlling the direction of current flow through the separately excited field winding 11, the direction of rotation of the motor M may be controlled.

The essence of my invention centers about the field forcing unit for the separately excited shunt field 11, essentially comprising an electromagnet 16 which is adapted to attract an armature 17 which is pivoted on a fulcrum 18 against the action of the biasing spring 19 for separating a plurality of contact members 20, each of which shunts a portion of the resistor unit 15. It will be apparent that the spring 19 biases the contact members 20 to the closed position, thereby normally shunting the various portions of resistor unit 15.

In operation, such would be the condition existing while the motor was accelerating which would mean that during acceleration and retardation, the resistor unit 15 is shunted, hence, a greater amount of current will flow through the separately excited field 11, or, in other words, the separately excited field 11 will be "forced."

However, when the voltage rises to a predetermined value, say 75 volts, sufficient current will flow through the operating or voltage coil 21 of electromagnet 16 to cause attraction of the left end of armature 17, hence to effect successive separation of the respective contact members 20 which will have the effect of progressively inserting portions of the resistor unit 15 in series with field winding 11, hence reducing the current flow therethrough.

As the dropout value or voltage at which the contact members 20 will again close, is much less than the "pick up" value, the contact members will not again close until the voltage falls to a relatively low value. As an illustration the normal value of the self-excited shunt field current would be 16 amperes, that is, with resistance 15 in series with it. During the accelerating period, however, the current value flowing through the separately excited field winding would be 35 amperes. When the generator voltage increases to say approximately 75 volts sufficient current would flow in the operating coil 21 of the contact breaking device to cause contact members 20 to open and insert the resistance 15. Contact members 20 would not again close until the generator voltage had declined to approximately 10 volts.

The operation of the device in complete detail is as follows: Assume that it is desired to drive motor M in a particular direction, say the forward direction. Controller C is moved to the number 1 "forward" position, thereby completing a circuit from the (+) terminal or conductor 3 through conductor 22, coil 23 to the (—) terminal or conductor 4. This will effect closing of contact members 24 which will in turn shunt a portion of the resistor 6 so as to increase current flow through the motor winding 5. Another circuit would be completed from the (+) terminal through conductor 25, actuating coil 26, conductor 27 to the (—) terminal, thereby effecting closing of contact members 28 and 29 of the "forward" contactor 30. This will effect completion of still another circuit which may be traced from the (+) terminal through conductors 31 and 32, contact members 29, conductor 33, resistors 14, 13 and 12, separately excited field winding 11, conductor 34, resistor unit 15, conductor 49, contact members 28, conductor 35 to the (—) terminal. During the "off" position, as well as the first position, either forward or reverse of the controller, a circuit will be completed from the (+) terminal through conductor 35', actuating coil 36, conductors 37 and 38 to the (—) terminal, thereby effecting closing of contact members 39, which in turn shunt the field discharge resistor 40 across the field winding 11, as is well-known in the art. In positions other than the first position, either forward or reverse, coil 36 will be de-energized; hence the field discharge resistor circuit will be interrupted. In the third, fourth, and fifth, forward positions, a circuit will be completed through conductors 41, 42, 43, respectively, and will effect energization of actuating coils 44, 45 and 46, respectively, which in turn effect shunting of resistors 12 and 13 and the lower portion of resistor 10, respectively, as will be readily apparent from inspection of the control diagram. This successive shunting of resistors provides a progressive voltage control for generator G. It will be apparent from the symmetry of the contact segments of controller C that the same succession of contact closing is likewise effective in the reverse direction of movement of the controller C. The difference when controller C is operated in a reverse direction is that "reverse" contactor 50 instead of "forward" contactor 30 is energized; hence, the direction of current flow through the separately excited field winding is reversed, that is, the current flow may now be traced from the (+) terminal through conductor 31 through contact members 45', conductor 49, resistor unit 15, conductor 34, field winding 11, resistors 12, 13 and 14, conductors 33 and 46', contact members 47, conductor 48 to the (—) terminal.

When controller C is moved from the forward direction to the reverse direction, the generator voltage does not collapse immediately since the self-excited field 9 of the generator which is under this condition supplied with voltage from the motor due to regeneration tends to maintain the generator voltage. The current that flows through the generator differential field 7 during retardation is also in a direction that assists in maintaining the generator voltage.

It is, of course, very desirable that the generator voltage not collapse instantaneously, otherwise excessive current would be generated by the motor and retardation would be so rapid as to severely stress the apparatus, being retarded. However, as the motor slows down its retarding effect and voltage diminishes, so that it is desirable to again strengthen separately excited generator field 9.

If the motor is driving the machine in one direction and it is desirable to reverse, the manipulation of the master switch will cause the current flowing in the separately excited field of the generator to be reversed, and the generator voltage will tend to decline to a value lower than that produced by the motor, now acting as a generator.

This giving out of power by the motor will cause the motor to slow down at a diminishing rate. To shorten the time required to cause the motor to come to rest, it is desirable to again increase the generator voltage when the voltage produced by the motor declines to a relatively low value.

Inasmuch as the operating coil 21 is connected across the conductors that are common to both motor and generator, the contacts of the field forcing relay will tend to close as the voltage generated by the motor declines, with the result, that the excitation of the generator separately excited field will be increased. This will result in raising the generator voltage to a value that will cause current to flow through the motor in a direction that will hasten its reversal and cause it to rapidly accelerate once it is reversed.

It will be apparent that instead of a resistor unit 15 comprising a plurality of resistor portions, a single resistor could be substituted with a shunting contact. Likewise, it will be apparent that instead of depending upon a generator voltage for effecting opening of contact members 20, it is quite possible that a control embodying a change in current or a change in voltage and current might be substituted to effect the operation of contact members 20.

It is also apparent that if the separately excited field is reversed, that an immediate reduction in generator voltage will occur. The reduction in generator voltage will be in proportion (neglecting the effect of the differentially wound series field) to the strength of the separately excited field. If the separately excited field was weak, before it was reversed and after it was reversed, the effect on the generator voltage would be less than if the field were fully excited. Stating it differently the generator voltage would decline less.

It is now obvious that with only a small reduction in generator voltage, that the amount of current that the motor could force through the generator would be limited and consequently excessive retarding torque of the motor would also be limited (limitation of torque and current peak is the object of this invention).

The slowing down of the motor as well as the effect of the reversing of the current flowing through the separately excited generator field (the reversal of the field is due to the reversing of the control connections) will cause the generator voltage to decline to a value that will cause the relay 18 to permit its contact or contacts to again close and strengthen the separately excited field and thus increase the rate of decline of generator voltage, so that a greater amount of current can be forced through the generator by the motor. This causes the motor to exert greater retarding torque during the latter part of the retardation period.

As soon as the generator voltage exceeds that of the motor, the direction of motor rotation will be reversed, providing the contactors controlling the separately excited field are allowed to remain in the closed position.

Furthermore, while my invention has been shown as applied to an electrical shovel S, it will be readily apparent that it is equally applicable to any other type of load requiring speed control of a driving motor.

I am, of course, aware that others, particularly after having had the benefit of the teachings of my invention, may devise other devices and systems of control embodying my invention, and I, therefore, do not wish to be limited to the specific showings made in the drawing and the descriptive disclosure hereinbefore made, but wish to be limited only by the scope of the appended claims and such prior art that may be pertinent.

I claim as my invention:

1. A variable voltage control system including, in combination, a motor, a generator for energizing said motor which generator includes a differential series field winding, a self-excited field winding, and a separately excited field winding having a resistor in series therewith, a plurality of contacts each of which shunts a different portion of said resistor, a spring biased armature for normally closing said contacts, electromagnetic means including a voltage coil connected across the generator for overcoming said spring bias on the armature as the result of attainment of a predetermined normal value of voltage encountered during a portion of the normal accelerating period thereby progressively opening said contacts thus progressively inserting more and more of said resistor in series with said separately excited field winding.

2. A variable voltage control system including, in combination, a motor, a generator for energizing said motor which generator includes a differential series field winding, a self-excited field winding, and a separately excited field winding having a resistor in series therewith, a plurality of contacts each of which shunts a different portion of said resistor, a spring biased armature for normally closing said contacts, electromagnetic means including a voltage coil connected across the generator for overcoming said spring bias on the armature as the result of attainment of a predetermined normal value of voltage encountered during a portion of the normal accelerating period thereby progressively opening said contacts thus progressively inserting more and more of said resistor in series with said separately excited field winding, the voltage value of said voltage coil for overcoming the spring bias to open the contacts being greater than that for effecting restoration of said spring bias to close the contacts.

3. A variable voltage control system including, in combination, a motor, a generator for energizing said motor which generator includes a differential series field winding, a self-excited field winding, and a separately excited field winding having a resistor in series therewith, means for normally shunting said resistor during a portion of the accelerating period of the motor, means responsive to the attainment of a predetermined normal value of generator voltage encountered during a portion of the normal accelerating period for removing, at least partially, said shunting means, said means being additionally responsive to a subsequent fall of generator voltage as the result of the differential field winding action ensuing from the development of a predetermined value of torque for again shunting said resistor and increasing the current through said separately excited field winding, and means for reversing the direction of current through said separately excited means thereby reversing the direction of motor rotation, said self-excited field winding, owing to regeneration of the motor during reversal, and said differential field winding producing flux in a direction to assist maintenance of the generator voltage, said means responsive to generator voltage being effective to increase the retarding effort for the latter part of the retardation period.

4. A variable voltage control system including, in combination, a motor, a generator for energizing said motor which generator includes a differential series field winding, a self-excited field winding, and a separately excited field winding having a resistor in series therewith, means for normally shunting said resistor during a portion of the accelerating period of the motor, a voltage coil connected across the terminals of said generator and responsive to the attainment of a predetermined normal value of generator voltage encountered during a portion of the normal accelerating period for removing, at least partially, said shunting means, said voltage coil being additionally responsive to a subsequent fall of generator voltage resulting from the differential field winding action due to development of a predetermined value of torque for again shunting said resistor and forcing the field of said separately excited field winding, and means for reversing the direction of current through said separately excited means thereby reversing the direction of motor rotation, said self-excited field winding, owing to regeneration of the motor during reversal, and said differential field winding producing flux in a direction to assist maintenance of the generator voltage, said means responsive to generator voltage being effective to increase the retarding effort for the latter part of the retardation period.

5. A variable voltage control system including, in combination, a motor, a generator for energizing said motor which generator includes a differential series field winding, a self-excited field winding, and a separately excited field winding having a resistor in series therewith, means for normally shunting said resistor during a portion of the accelerating period of the motor, a voltage coil connected across the terminals of said generator and responsive to the attainment of a predetermined normal value of generator voltage encountered during a portion of the normal accelerating period for removing, at least partially, said shunting means, said voltage coil being additionally responsive to a subsequent fall of generator voltage resulting from the differential field winding action due to development of a predetermined value of torque for again shunting said resistor and forcing the field of said separately excited field winding, the pick-up value of said voltage coil for removing said shunting means being substantially greater than the drop-out value thereof for restoring said shunting means, and means for reversing the direction of current through said separately excited means thereby reversing the direction of motor rotation, said self-excited field winding, owing to regeneration of the motor during reversal, and said differential field winding producing flux in a direction to assist maintenance of the generator voltage, said means responsive to generator voltage being effective to increase the retarding effort for the latter part of the retardation period.

6. A variable voltage control system including, in combination, a motor, a generator for energizing said motor which generator includes a differential series field winding, a self-excited field winding, and a separately excited field winding having a resistor in series therewith, contact means shunting said resistor, an armature which is biased so as to normally close said contact means, electromagnetic means responsive to the voltage of said generator for overcoming the bias of said armature upon attainment of a predetermined normal value of voltage encountered during a portion of the normal accelerating period to open said contact means thereby reinserting said resistor in series with said separately excited field winding, and means for reversing the direction of current through said separately excited means thereby reversing the direction of motor rotation, said self-excited field winding, owing to regeneration of the motor during reversal, and said differential field winding producing flux in a direction to assist maintenance of the generator voltage, said means responsive to generator voltage being effective to increase the retarding effort for the latter part of the retardation period.

7. A variable voltage control system including, in combination, a motor, a generator for energizing said motor which generator includes a differential series field winding, a self-excited field winding, and a separately excited field winding having a resistor in series therewith, contact means shunting said resistor, an armature which is biased so as to normally close said contact means, electromagnetic means responsive to the voltage of said generator for overcoming the bias of said armature upon attainment of a predetermined normal value of voltage encountered during a portion of the normal accelerating period to open said contact means thereby reinserting said resistor in series with said separately excited field winding, said electromagnetic means including a coil connected across the generator terminals which has a pick-up value of a greater voltage value than the drop-out value, and means for reversing the direction of current through said separately excited means thereby reversing the direction of motor rotation, said self-excited field winding, owing to regeneration of the motor during reversal, and said differential field winding producing flux in a direction to assist maintenance of the generator voltage, said means responsive to generator voltage being effective to increase the retarding effort for the latter part of the retardation period.

8. A variable voltage control system including, in combination, a motor, a generator for energizing said motor which generator includes a differential series field winding, a self-excited field winding, and a separately excited field winding having a resistor in series therewith, a plurality of contacts each of which shunts a different portion of said resistor, a spring biased armature for normally closing said contacts, electromagnetic means including a voltage coil connected across the generator for overcoming said spring bias on the armature as the result of attainment of a predetermined normal value of voltage encountered during a portion of the normal accelerating period thereby progressively opening said contacts thus progressively inserting more and more of said resistor in series with said separately excited field winding, and means for reversing the direction of current through said separately excited means thereby reversing the direction of motor rotation, said self-excited field winding, owing to regeneration of the motor during reversal, and said differential field winding producing flux in a direction to assist maintenance of the generator voltage, said means responsive to generator voltage being effective to increase the retarding effort for the latter part of the retardation period.

9. A variable voltage control system including, in combination, a motor, a generator for energizing said motor which generator includes a differential series field winding, a self-excited field winding, and a separately excited field winding having a resistor in series therewith, a plurality of contacts each of which shunts a different portion of said resistor, a spring biased armature for normally closing said contacts, electromagnetic means including a voltage coil connected across the generator for overcoming said spring bias on the armature as the result of attainment of a predetermined normal value of voltage encountered during a portion of the normal accelerating period thereby progressively opening said contacts thus progressively inserting more and more of said resistor in series with said separately excited field winding, the voltage value of said voltage coil for overcoming the spring bias to open the contacts being greater than that for effecting restoration of said spring bias to close the contacts, and means for reversing the direction of current through said separately excited means thereby reversing the direction of motor rotation, said self-excited field winding, owing to regeneration of the motor during reversal, and said differential field winding producing flux in a direction to assist maintenance of the generator voltage, said means responsive to generator voltage being effective to increase the retarding effort for the latter part of the retardation period.

PHELAN McSHANE.